United States Patent
Wennemer et al.

(10) Patent No.: US 8,618,415 B2
(45) Date of Patent: Dec. 31, 2013

(54) PORTABLE ELECTRONIC DEVICE AND METHOD OF MANUFACTURING PARTS THEREOF

(75) Inventors: Dietmar Frank Wennemer, Waterloo (CA); Steven Andrew Prsa, Kitchener (CA); Michael Welker, Waterloo (CA); Simon Coulson, Hamilton (CA)

(73) Assignee: BlackBerry Limited, Ontario ( * ) Notice: Subject to any disclaimer, the term of this patent is extended or adjusted under 35 U.S.C. 154(b) by 302 days.

(21) Appl. No.: 12/910,604

(22) Filed: Oct. 22, 2010

(65) Prior Publication Data

US 2012/0097412 A1 Apr. 26, 2012

(51) Int. Cl.
*H05K 5/00* (2006.01)
*H05K 5/03* (2006.01)

(52) U.S. Cl.
USPC ......... 174/50; 174/67; 455/575.1; 455/575.8; 150/154; 206/703

(58) Field of Classification Search
USPC ......... 174/50, 520, 66, 67; 220/241, 242, 3.2; 361/600, 679.01, 679.03, 679.09, 361/679.26, 679.3, 679.56, 679.58, 752, 361/679.21; 455/575.1, 575.8, 90.3; 150/165, 154; 206/592, 320, 701, 703; 429/100
See application file for complete search history.

(56) References Cited

U.S. PATENT DOCUMENTS

| | | | |
|---|---|---|---|
| 5,164,542 A | 11/1992 | Hart | |
| 6,051,307 A | 4/2000 | Kido et al. | |
| 6,400,571 B1 | 6/2002 | Kimura et al. | |
| 6,487,073 B2 | 11/2002 | McCullough et al. | |
| 6,868,602 B2 | 3/2005 | McCullough | |
| 6,900,984 B2 | 5/2005 | Merz et al. | |
| 6,905,768 B2 | 6/2005 | Tada et al. | |
| 6,967,833 B2 | 11/2005 | Boykin et al. | |
| 6,996,425 B2 | 2/2006 | Watanabe | |
| 7,012,189 B2 | 3/2006 | Kriege et al. | |
| 7,019,967 B2 | 3/2006 | DiFonzo et al. | |
| 7,153,576 B2 | 12/2006 | Wang et al. | |
| 7,301,761 B2 | 11/2007 | Merz et al. | |
| 7,457,111 B2 | 11/2008 | Merz et al. | |
| 7,636,244 B2 | 12/2009 | Kriege et al. | |
| 7,688,574 B2 * | 3/2010 | Zadesky et al. | 361/679.21 |
| 7,711,400 B2 * | 5/2010 | Nuovo | 455/575.8 |
| 7,824,770 B2 | 11/2010 | Honma et al. | |

(Continued)

FOREIGN PATENT DOCUMENTS

| | | |
|---|---|---|
| EP | 1219401 A2 | 7/2002 |
| EP | 1841185 A2 | 10/2007 |
| EP | 2047983 A1 | 4/2009 |
| EP | 2100719 A1 | 9/2009 |

OTHER PUBLICATIONS

Extended European Search Report; European Application No. 10188616.6—2307; Extended European Filing Date Apr. 4, 2011; Date of Mailing Apr. 27, 2011; 7 pages.

(Continued)

*Primary Examiner* — Angel R Estrada
(74) *Attorney, Agent, or Firm* — Cantor Colburn LLP

(57) ABSTRACT

A method of manufacturing a portion of a portable electronic device includes forming a glass fiber laminate sheet to provide a formed glass fiber laminate body, and overmolding a rim on the body. The rim includes a connector for coupling with a complementary part of the portable electronic device.

20 Claims, 8 Drawing Sheets

(56) References Cited

U.S. PATENT DOCUMENTS

| | | |
|---|---|---|
| 7,835,147 B2 | 11/2010 | Merz et al. |
| 7,907,400 B2 | 3/2011 | Bekele |
| 7,947,900 B2 * | 5/2011 | Cheng et al. .................. 174/50 |
| 2005/0117292 A1 | 6/2005 | DiFonzo et al. |
| 2005/0242471 A1 | 11/2005 | Bhatt et al. |
| 2006/0204731 A1 | 9/2006 | Wani et al. |
| 2007/0109737 A1 | 5/2007 | Kriege et al. |
| 2007/0165373 A1 | 7/2007 | Merz et al. |
| 2008/0032093 A1 | 2/2008 | Deng et al. |
| 2009/0040698 A1 | 2/2009 | Merz et al. |
| 2009/0110872 A1 | 4/2009 | DiFonzo et al. |
| 2009/0136708 A1 | 5/2009 | Huang et al. |
| 2009/0208721 A1 | 8/2009 | Tsuchiya et al. |
| 2009/0233044 A1 | 9/2009 | Sun et al. |
| 2010/0050556 A1 | 3/2010 | Burns |
| 2010/0119634 A1 | 5/2010 | Choiniere et al. |
| 2011/0128462 A1 | 6/2011 | Lin et al. |
| 2011/0188180 A1 | 8/2011 | Pakula et al. |

OTHER PUBLICATIONS http://www.fiercewireless.com/story/nokia-unveils-fancy-carbon-fiber-phone/2008-08-19 —published Aug. 19, 2008.

http://www.switched.com/2008/04/08/lgs-sexy-new-phone-offers-glass-carbon-fiber-mystique/—published Apr. 8, 2008.

http://www.toyobo.cojp/e/press/press14052009/htm—published Mar. 18, 2009.

http://www2.electronicproducts.com/LG_Electronics_Chocolate_KU800_Cell_Phone-whatsinside_text-55.aspx—published at least as early as Jan. 22, 2010.

http://www.bond-laminates.de/en/index.php?nav=3.02—published at least as early as Feb. 9, 2010.

http://www.alibaba.com/product-free/108371236/mobile_phone_protective_covers.html.—published at least as early as Feb. 24, 2010.

Extended European Search Report dated Apr. 27, 2011, in respect of corresponding European Patent Application No. 10188616.6.

* cited by examiner

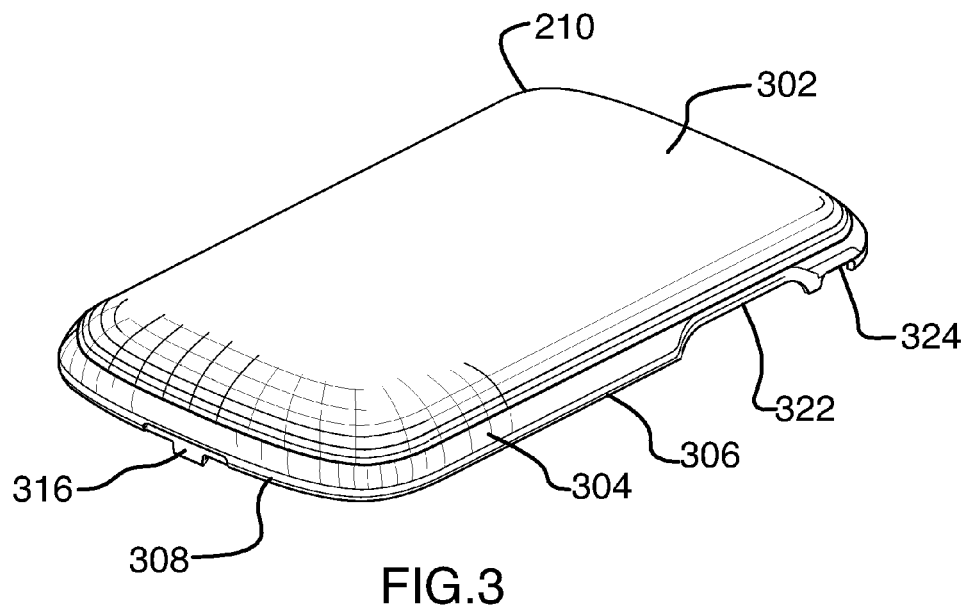
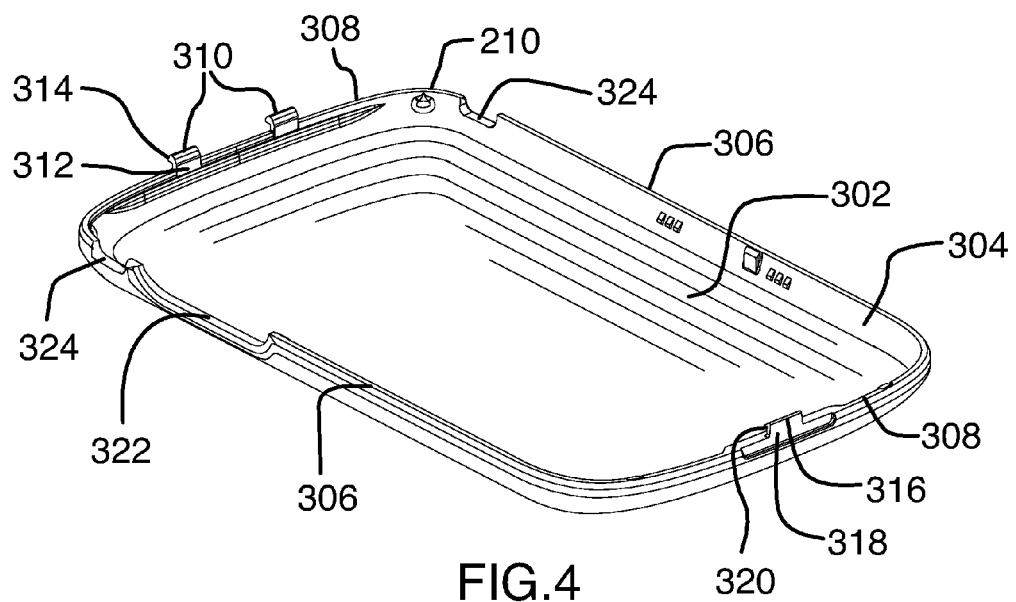

PORTABLE ELECTRONIC DEVICE AND METHOD OF MANUFACTURING PARTS THEREOF

FIELD OF TECHNOLOGY

The present disclosure relates to portable electronic devices and a method of manufacturing parts thereof.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 702.11 or Bluetooth capabilities.

Portable electronic devices such as PDAs or smart telephones are generally intended for handheld use and ease of portability. Smaller devices are generally desirable for portability. With increased functionality and features included in portable electronic devices, further reduction in size of components is desirable to maintain or further reduce the overall size of portable electronic devices.

BRIEF DESCRIPTION OF THE DRAWINGS

Embodiments of the present disclosure will now be described, by way of example only, with reference to the attached figures, wherein:

FIG. 3 is a perspective view of a back of the portable electronic device of FIG. 2A;

FIG. 4 is an alternative perspective view of a back of the portable electronic device of FIG. 2A;

DETAILED DESCRIPTION

Figure 1:
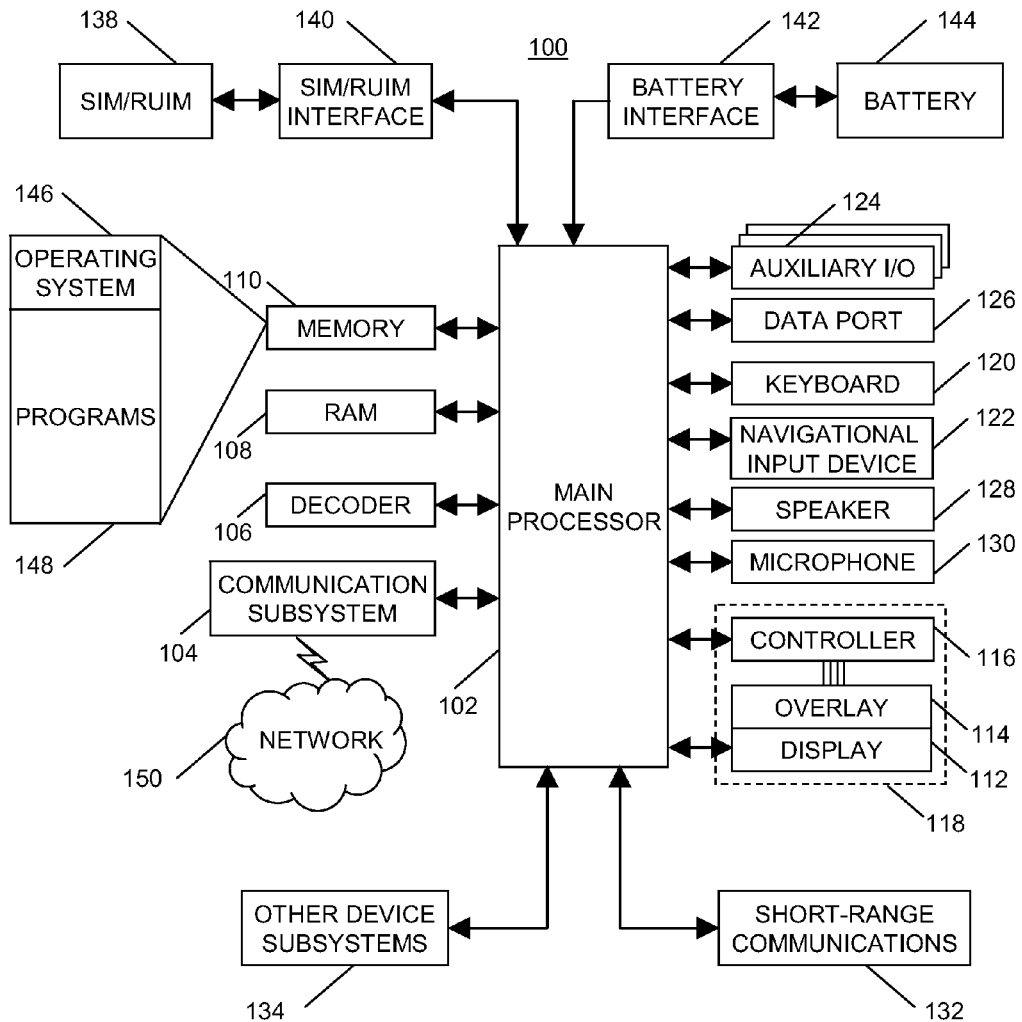
FIG. 1 is a block diagram of a portable electronic device in accordance with one example.

The following describes a portable electronic device and method of manufacturing a portion of the portable electronic device. The method includes forming a glass fiber laminate sheet to provide a formed glass fiber laminate body, and overmolding a rim on the body. The rim includes a connector for coupling with a complementary part of the portable electronic device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring first to FIG. 1, a block diagram of components of one example of a portable electronic device 100 is shown. The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, a keyboard 120, a navigational input device 122 such as an optical trackpad or a trackball, an auxiliary input/output (I/O) subsystem 124, a data port 126, a speaker 128, a microphone 130, short-range communications 132 and other device subsystems 134. User-interaction with the graphical user interface may be performed utilizing the touch-sensitive display 118. The processor 102 interacts with the touch-sensitive overlay 114 via the electronic controller 116. Information, such as text, characters, symbols, images, icons, and other features that may be displayed or rendered on a portable electronic device, are displayed on the display 112, via the processor 102.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components or programs 148 that are executed by the processor 102 and are typically stored in a persistent store such as flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2A:
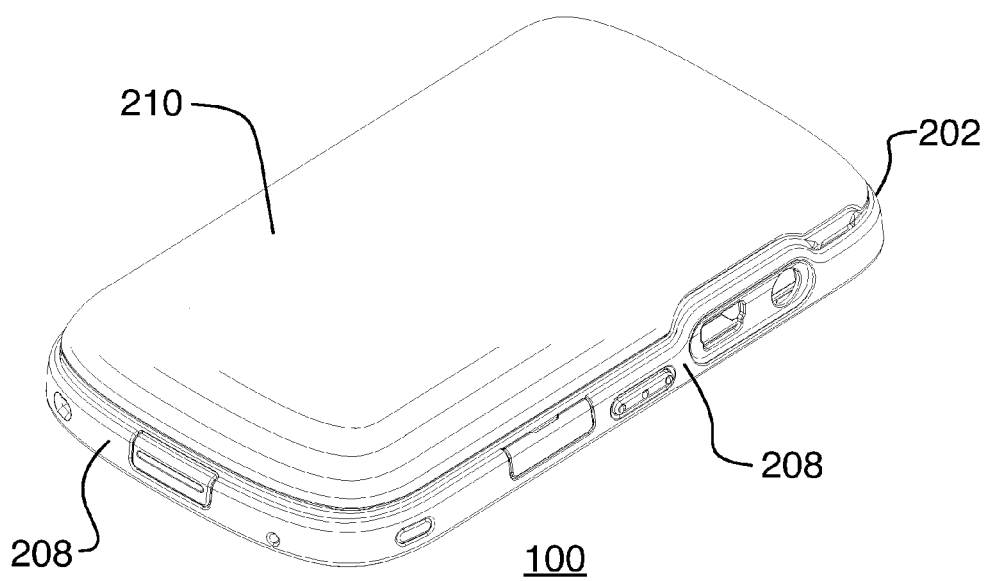
FIG. 2A and FIG. 2B are perspective views of a portable electronic device in accordance with an example.
Figure 2B:
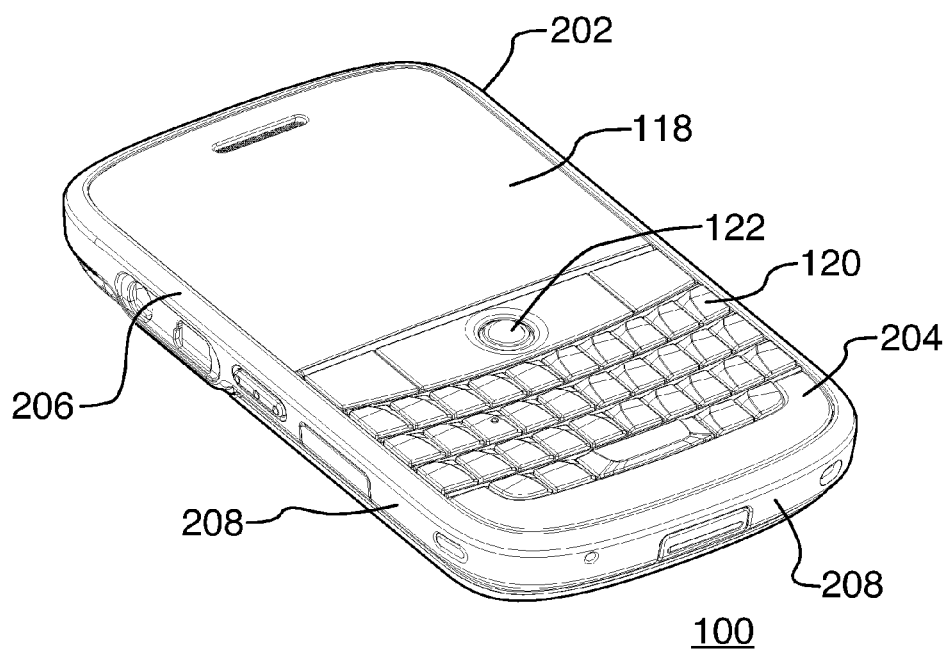

Reference is now made to FIG. 2A and FIG. 2B, which shows a perspective view of an example of the portable electronic device 100. The portable electronic device 100 includes a housing 202 that houses the internal components that are shown in FIG. 1 and frames the touch-sensitive display 118 such that the touch-sensitive display 118, the keyboard 120, and the navigational input device 122 are exposed for user-interaction when the portable electronic device 100 is in use.

The housing 202 may be any suitable housing for the internal components shown in FIG. 1. The housing 202 in the present example includes a front 204. The front 204 includes a frame 206 that frames the touch-sensitive display 118. The housing 200 also includes sidewalls 208 that extend between the front 204 and a back 210. The housing 202 may be injection molded, for example. In the example of the portable electronic device 100 shown in FIG. 2A and FIG. 2B, the frame 206 is generally rectangular although other shapes may be utilized.

Figure 5:
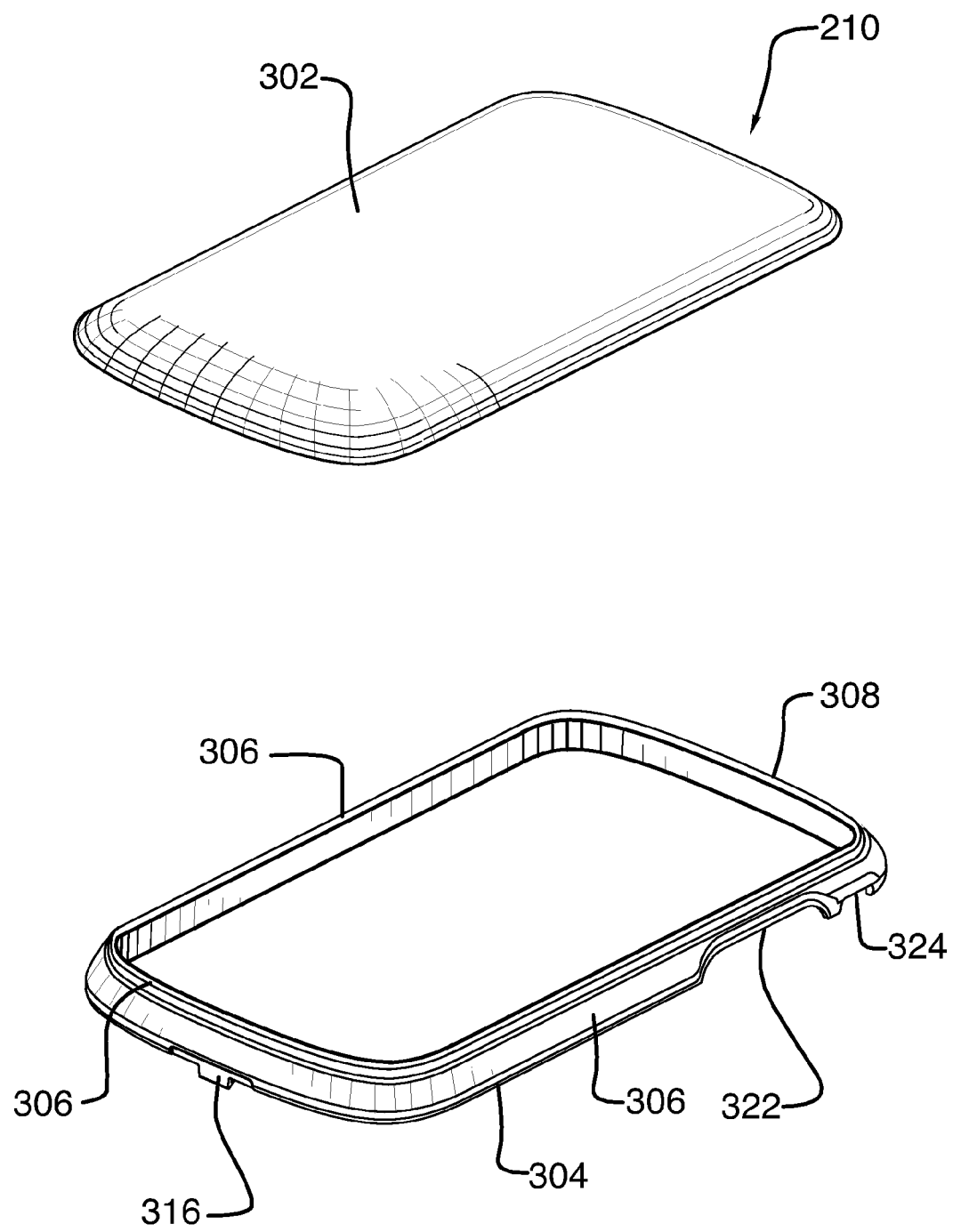
FIG. 5 is an exploded perspective view of a back of the portable electronic device of FIG. 2A.

Referring now to FIG. 3, FIG. 4, and FIG. 5, The back 210 includes a body 302 that is generally rectangular in shape with curved edges to form a generally rectangular bowl. The body 302 is made of glass fiber laminate including a glass woven fabric in a matrix material of thermoset and/or thermoplastic resins binder. Glass fiber laminate provides mechanical strength, rigidity and dimensional stability at a thickness that is less than the thickness of a plastic back. Any suitable resin material may be utilized. Any suitable woven glass sheet of suitable thickness may be utilized. The thickness may depend on the mechanical design of the part. The back 210 also includes a rim 304 that is coupled to and extends around the edge of the body 302. The rim 304 is made of a suitable plastic and is thicker than the body to provide a mechanical interlock with the body and to provide mechanical strength. The rim is overmolded to provide features for cooperating with the front 204 to releasably couple the back 210 to the front 204. The plastic utilized for the rim may be dependent on the type of resin used in the laminate. The rim 304 includes long sides 306 and short sides 308 around the body 302 and connectors (described in further detail below) extend from the rim 304 to couple the back 210 with the front 204 (shown in FIG. 2A and FIG. 2B) of the portable electronic device 100.

The connectors may include any suitable connectors for releasably coupling the back 210 to the front 204. In the example shown in FIG. 3 and FIG. 4, the connectors are snap-fit connectors that extend from the short sides 308 of the rim 304. One of the short sides 308 includes two snap-fit connectors 310. Each snap-fit connector 310 includes a beam 312 with a lip 314 that extends outwardly, away from the body 302, to insert into a complementary recess (not shown) in the front 204 of the portable electronic device 100 and thereby engage the front 204. The opposing one of the short sides 308 of the rim 304 includes a single snap-fit connector 316 centered along the opposing one of the short sides 308. The snap-fit connector 316 includes a beam 318 with a lip 320 that extends inwardly, generally toward the body 302, to insert into a complementary recess (not shown) in the front 204 of the portable electronic device 100 and thereby engage the front 204. Although a pair of snap-fit connectors 310 are utilized on one of the short sides 308 and a single snap-fit connector 316 is utilized on the opposing one of the shorts sides 308 in the example illustrated, any suitable number of connectors may be utilized. Further, the connectors may be located on any of the sides and other suitable connector types and shapes may be utilized. The connectors facilitate release of the back 210 from the front 204, for example, for insertion and removal of the battery and SIM/RUIM card.

In the example shown in FIG. 3, FIG. 4, and FIG. 5, the rim 304 also includes recesses, with a generally rectangular recess 322 extending along one of the long sides 306. The recess 322 is located to one side of the center of the long side 306, near the short side 308 from which the pair of connectors 310 extend. The recess 322 may be utilized to receive, for example, mechanical buttons that are coupled to the front 204 and fit into the recess 322, when the back 210 is coupled to the front 204 of the portable electronic device 100. The rim 304 may also include additional recesses, such as the recesses 324 on the opposing long sides 306, to accommodate other features such as buttons or to mechanically interlock with complementary features on the front 204 of the portable electronic device 100.

Figure 6:
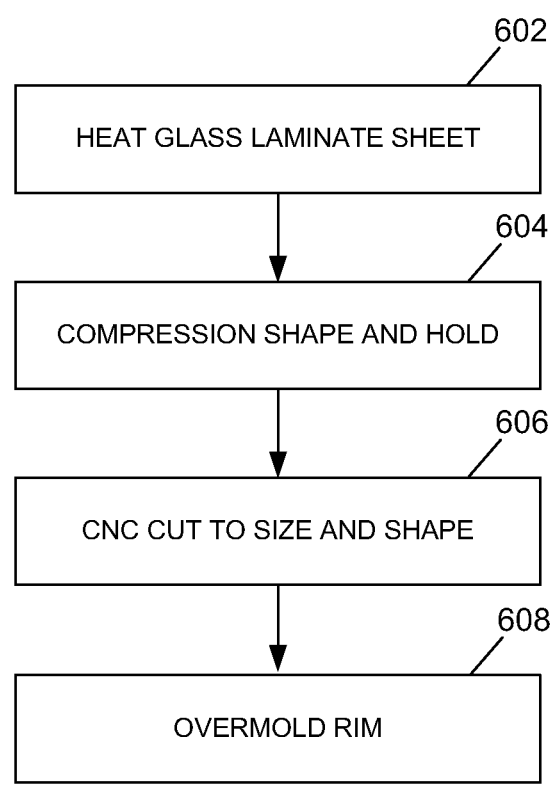
FIG. 6 is a flowchart illustrating a method of manufacturing a back of a portable electronic device.

A flowchart illustrating a method of manufacturing a portion of the portable electronic device 100, such as the back 210, is shown in FIG. 6. The method may contain additional or fewer processes than shown and/or described.

Figure 7:
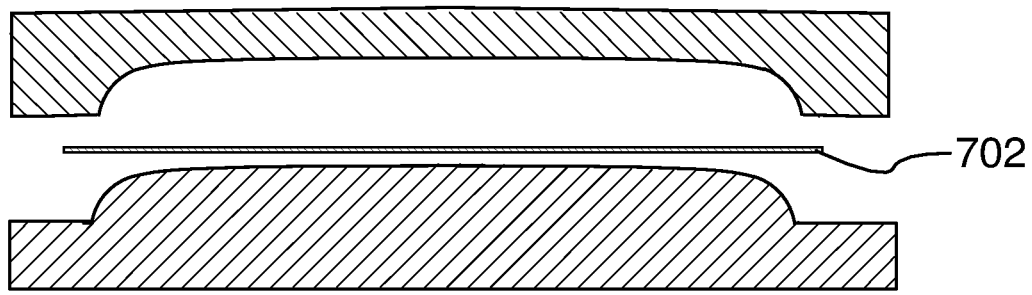
FIG. 7 is a sectional side view of a body of the back and a compression molding tool according to an example.

The back 210 is manufactured utilizing a flat glass laminate sheet 702, as shown in FIG. 7, that includes glass woven fabric in a resin binder. A dye or coating may be applied to the glass woven fabric prior to addition of the resin to provide the glass fiber laminate sheet. For example, the glass woven fabric may be dyed utilizing a suitable dye, such as a fabric dye, to provide a dyed glass woven fabric in the resin binder. Dying of the glass woven fabric may be carried out in a continuous dipping process during the manufacture of the glass fiber laminate sheet, or in any other suitable process. Optionally, a coating may be applied to the glass woven fabric, in addition to or in place of the dye. The coating may be, for example, a Non-Conductive Vacuum Metalized (NCVM) coating or any other suitable coating.

Figure 8:
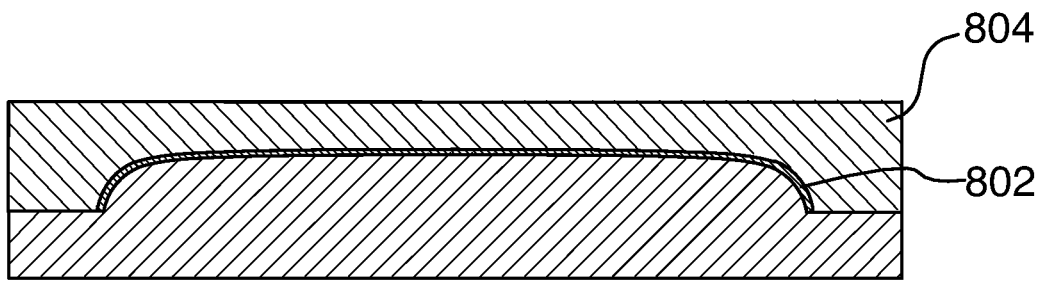
FIG. 8 is a sectional side view of the body in the compression molding tool.
Figure 9:
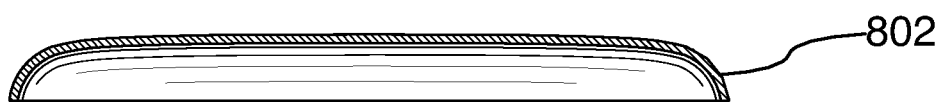
FIG. 9 is a sectional side view of the body after compression molding.
Figure 10:
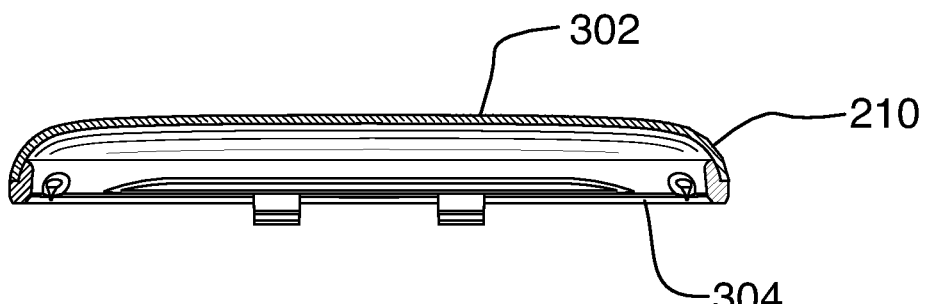
FIG. 10 is a sectional side view of the back.

The glass fiber laminate sheet 702 is formed by heating at 602 and compression shaping at 604 to provide a shaped sheet 802, as shown in FIG. 8. The heating temperature is dependent on the type of resin utilized in the glass fiber laminate sheet. The glass fiber laminate sheet may be heated prior to placement in the compression tool, or in the compression tool, which may be referred to as thermoforming, or both prior to placement in the compression tool and when in the compression tool. The glass fiber laminate sheet is shaped by utilizing the compression tool 804 to compress and hold the glass fiber laminate sheet in the compressed state for a suitable period of time to facilitate setting of the glass fiber laminate sheet in the compressed shape. The time to facilitate setting of the glass fiber laminate sheet may be dependent on the resin utilized in the glass fiber laminate sheet. The shaped sheet 802 is then cut to a desired size and shape at 606, for example, utilizing a CNC machine to provide the body 302 shown in FIG. 9. After cutting, the body 302 is disposed in a molding machine of suitable shape and the rim 304, including the connectors and recesses, is overmolded on the body 302 at 608, to provide the back 210 shown in FIG. 10. The plastic utilized for the rim 304 may be dependent on the type of resin in the glass fiber laminate sheet and the thickness may be dependent on the device. The plastic rim is bonded to the formed glass fiber laminate. An activator may be utilized to facilitate bonding. Further, mechanical interlocks and/or application of a texture to the surface of the glass fiber laminate may also be utilized to facilitate bonding and increase bond strength.

Optionally, leather may be cut to size and fixed to the body 302 using a suitable adhesive to provide a portion of a back with a desirable leather look and feel. The portion of the back is thin by comparison to a leather-covered plastic portion.

Figure 11:
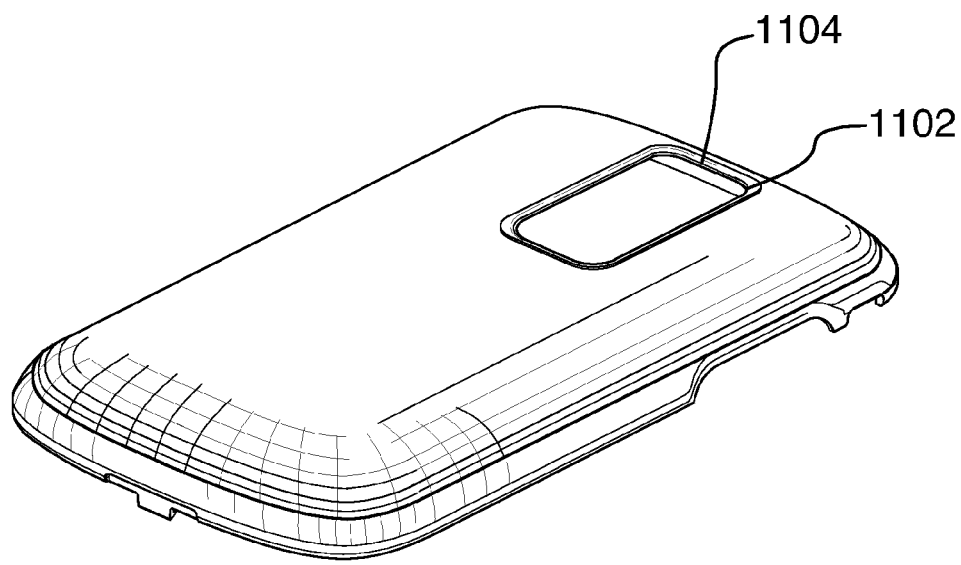
FIG. 11 is a perspective view of another example of a back of a portable electronic device.
Figure 12:
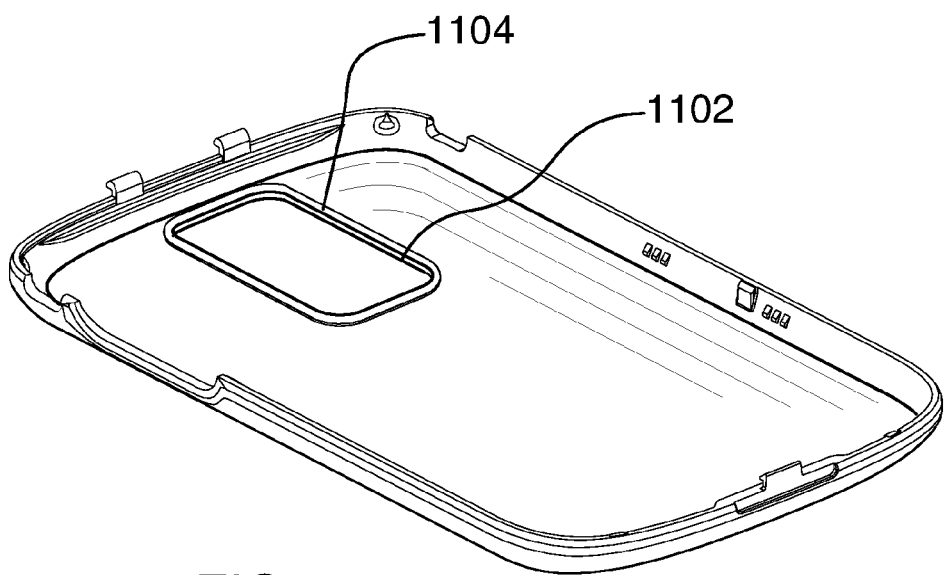
FIG. 12 is an alternative perspective view of another example of a back of a portable electronic device.
Figure 13:
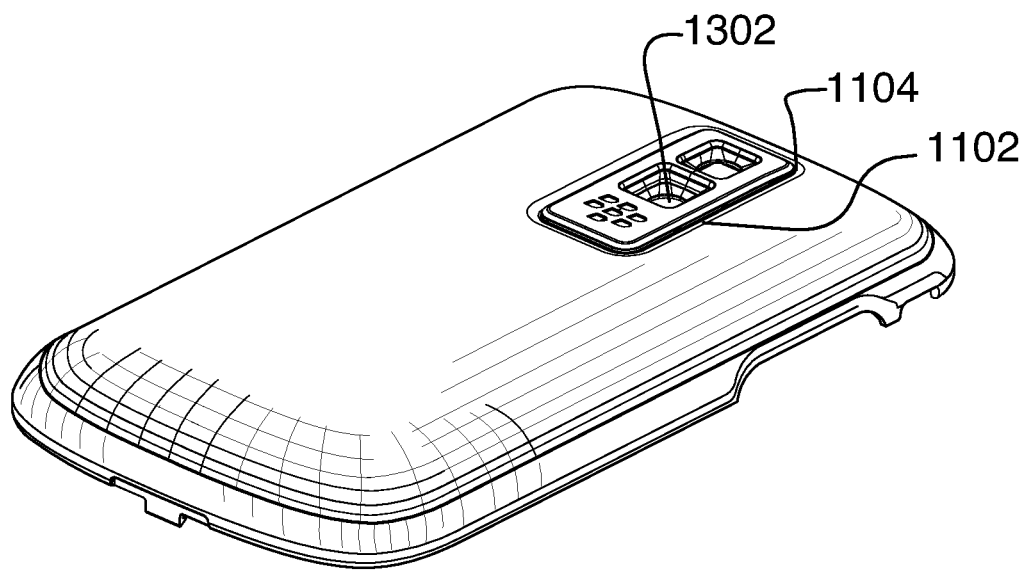
FIG. 13 is a perspective view of the example of the back of FIG. 11, including an additional snap-in feature.

Reference is made to FIG. 11 and FIG. 12 to describe another example of a back according to the present disclosure. The back shown in FIG. 11 and FIG. 12 is similar to the back shown in FIG. 3 and FIG. 4 and is therefore not described again in detail. In the example shown in FIG. 11 and FIG. 12, however, the back 302 includes a void that may be formed, for example, by cutting utilizing the CNC machine. An interior plastic rim 1104 may also be molded around the outer perimeter or edge 1102 of the void. The interior plastic rim 1104 is utilized to facilitate connection to, for example, a camera lens 1302 for a portable electronic device that includes camera functionality, as shown in FIG. 13.

In other examples, rather than the entire back of the portable electronic device, a portion of the back may comprise a body and a rim. For example, a battery cover may comprise a glass fiber laminate body and a rim that is coupled to and extends around the edge of the body. In the example of the battery cover, the cover is releasably attachable to the remainder of the back utilizing connectors such as those described above with reference to FIG. 3, FIG. 4, and FIG. 5, for insertion and removal of, for example, a battery and a SIM/RUIM card.

Advantageously, a back portion of the portable electronic device is made of glass fiber laminate with an overmolded rim of plastic. The glass fiber laminate provides mechanical strength, rigidity and dimensional stability. The plastic rim is overmolded around the periphery of the glass fiber laminate and provides interlocking features for cooperating with the housing of the portable electronic device to releasably couple the back portion to the housing. The use of glass fiber laminate provides a portion that is thin relative to a plastic portion, while providing suitable strength, rigidity, and dimensional stability.

According to one aspect, a method of manufacturing a portion of a portable electronic device is provided. The method includes forming a glass fiber laminate sheet to provide a formed glass fiber laminate body, and overmolding a rim on the body. The rim includes a connector for coupling with a complementary part of the portable electronic device.

According to another aspect, a portion of a portable electronic device is provided. The portion includes a glass fiber laminate body, and a plastic rim at an edge of the body, the rim including a connector for coupling with a complementary part of the portable electronic device.

According to still another aspect, a portable electronic device is provided. The portable electronic device includes the above portion.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

The invention claimed is:

1. A portion of a portable electronic device, the portion comprising:
    a glass fiber laminate body including curved longitudinal and width-wise edges formed to define a portion of an interior of the portable electronic device, a curvature of the curved edges being configured to define a depth-wise curvature of the portion of the interior; and
    a plastic rim disposed at the curved edges of the body, the rim including a connector configured to couple with a complementary part of the portable electronic device.

2. The portion according to claim 1, wherein the plastic rim extends around the curved edges of the body.

3. The portion according to claim 1, wherein the portion comprises a back portion.

4. The portion according to claim 3, wherein the back portion comprises a battery cover.

5. The portion according to claim 1, wherein the connector includes a beam with a lip engageable with a recess in the complementary part of the portable electronic device to releasably couple the portion of the portable electronic device with the complementary part of the portable electronic device.

6. The portion according to claim 1, comprising a plurality of connectors engageable with recesses in the complementary part of the portable electronic device to releasably couple the portion of the portable electronic device with the complementary part of the portable electronic device.

7. The portion according to claim 1, wherein the rim is thicker than the body.

8. The portion according to claim 1, wherein the rim includes a recess for receiving a functional component of the portable electronic device.

9. The portion according to claim 1, wherein the glass fiber laminate body comprises dyed glass woven fabric in a matrix material.

10. The portion according to claim 1, wherein the glass fiber laminate body comprises coated glass woven fabric in a matrix material.

11. The portion according to claim 1, wherein the glass fiber laminate body has a rectangular bowl configuration.

12. The portion according to claim 1, wherein the glass fiber laminate body includes a flat back and sides that are outwardly of the flat back and end in the curved edges, and wherein the back and sides have a same thickness.

13. A portable electronic device comprising:
    a housing; and
    a back comprising:
        a glass fiber laminate body including curved longitudinal and width-wise edges formed to define a portion of an interior of the portable electronic device, a curvature of the curved edges being configured to define a depth-wise curvature of the portion of the interior; and
        a plastic rim disposed at the curved edges of the body, the rim including a connector configured to couple with the housing.

14. The portable electronic device according to claim 13, wherein an exterior face of the plastic rim forms a smooth interface with an exterior surface of the glass fiber laminate body at the curved edges.

15. The portable electronic device according to claim 13, wherein the glass fiber laminate body is formed to define a void and further comprising a plastic rim disposed around a perimeter of the void.

16. The portable electronic device according to claim 13, wherein the glass fiber laminate body is a rectangular bowl.

17. The portable electronic device according to claim 13, wherein the glass fiber laminate body includes a flat back and sides that are outwardly of the flat back and end in the curved edges, and wherein the back and sides have a same thickness.

18. A portion of a portable electronic device, the portion comprising:
- a glass fiber laminate body including curved longitudinal and width-wise edges formed to define an interior of the portion of the portable electronic device, a curvature of the curved edges being configured to define a depth-wise curvature of the interior of the portion of the portable electronic device; and
- a rim disposed at the inwardly curved edges of the body, the rim including a connector for coupling with a complementary part of the portable electronic device.

19. The portion of a portable electronic device according to claim 18, wherein the glass fiber laminate body has a generally rectangular bowl configuration.

20. The portion of a portable electronic device according to claim 18, wherein the glass fiber laminate body has a flat back and sides that are outwardly of the flat back, wherein the back and sides have a same thickness, and wherein the edges are on the sides.

\* \* \* \* \*